United States Patent [19]

Trautwein

[11] 4,246,307

[45] Jan. 20, 1981

[54] TAMPER-PROOF LAMINATED STICKER OR CARD

[76] Inventor: Hansjörg Trautwein, Am Stadtgarten 1, 4650 Gelsenkirchen, Fed. Rep. of Germany

[21] Appl. No.: 971,419

[22] Filed: Dec. 20, 1978

[30] Foreign Application Priority Data

| Dec. 23, 1977 [DE] | Fed. Rep. of Germany | 2757718 |
| Feb. 11, 1978 [DE] | Fed. Rep. of Germany | 2805834 |
| Mar. 7, 1978 [DE] | Fed. Rep. of Germany | 2809692 |
| Mar. 15, 1978 [DE] | Fed. Rep. of Germany | 2811217 |
| May 3, 1978 [DE] | Fed. Rep. of Germany | 2819390 |
| Jun. 28, 1978 [DE] | Fed. Rep. of Germany | 2828309 |
| Jul. 20, 1978 [DE] | Fed. Rep. of Germany | 2831853 |
| Dec. 6, 1978 [DE] | Fed. Rep. of Germany | 2852661 |

[51] Int. Cl.³ .................. B32B 7/14; B65D 65/28; G09F 3/00
[52] U.S. Cl. ........................ 428/43; 40/2.2; 283/8 R; 428/195; 428/198; 428/916
[58] Field of Search ............ 428/43, 79, 132, 137, 428/195, 198, 352, 914, 915, 916; 40/2.2, 594, 615; 283/8 R, 8 A, 8 B, 12, 12.1, 12.2, 14

[56] References Cited

U.S. PATENT DOCUMENTS

| 1,445,070 | 2/1923 | Clune | 428/198 |
| 1,882,593 | 10/1932 | Hentschel | 428/914 X |
| 2,188,310 | 1/1940 | Price | 428/914 X |
| 2,684,316 | 7/1954 | Warshaw | 428/198 X |
| 2,738,916 | 3/1956 | Peters | 428/137 X |
| 2,889,233 | 6/1959 | Steffey | 428/914 X |
| 3,297,508 | 1/1967 | Jahp | 428/914 X |
| 3,309,257 | 3/1967 | Borack | 428/40 |
| 3,315,386 | 4/1967 | Kest et al. | 40/594 X |
| 3,432,376 | 3/1969 | Reed et al. | 428/914 X |
| 3,508,754 | 4/1970 | Shorin | 273/139 |
| 4,032,679 | 6/1977 | Aoyagi | 428/42 |
| 4,070,774 | 1/1978 | Staats et al. | 40/2.2 |

Primary Examiner—Henry F. Epstein
Attorney, Agent, or Firm—Karl F. Ross

[57] ABSTRACT

A laminate for use as a sticker, identity card, or the like has a back sheet having a front face bearing indicia and a back face that is provided with adhesive to adhere it to a substrate. The front face is adhered to a transparent cover sheet by means of a plurality of spaced-apart adhesive zones, so that any attempt to peel apart the laminate will result in tearing of the back sheet at these zones. In addition the adhesive on the back sheet may be provided in zones alternating with the zones on the front of the back sheet, so that irreversible destruction of this back sheet is ensured in the event of tampering.

24 Claims, 8 Drawing Figures

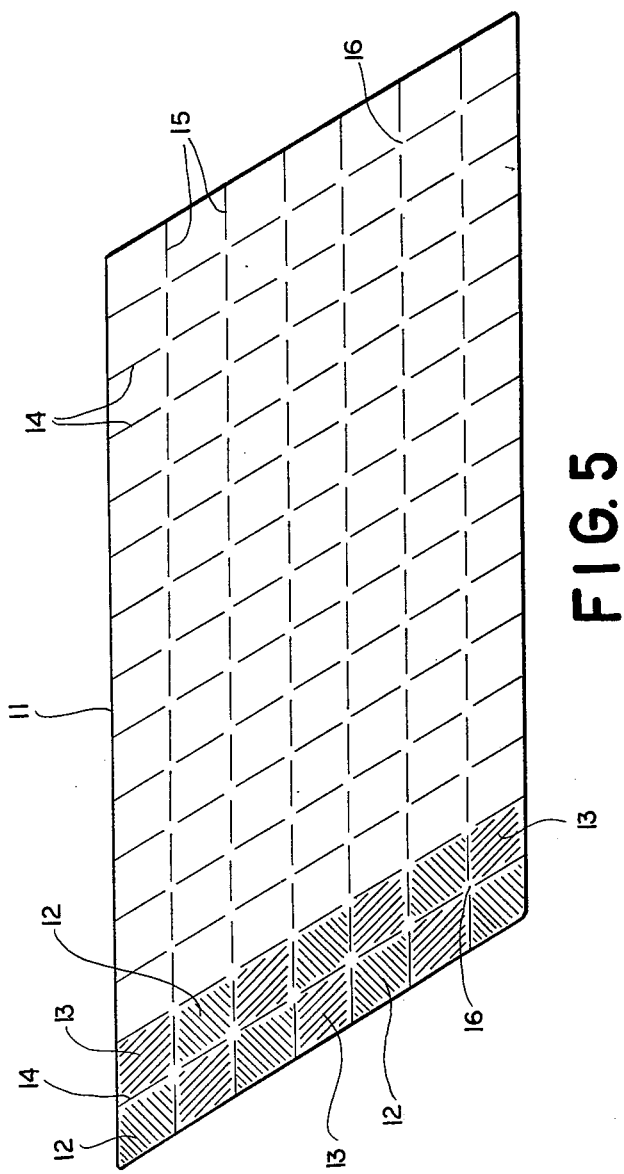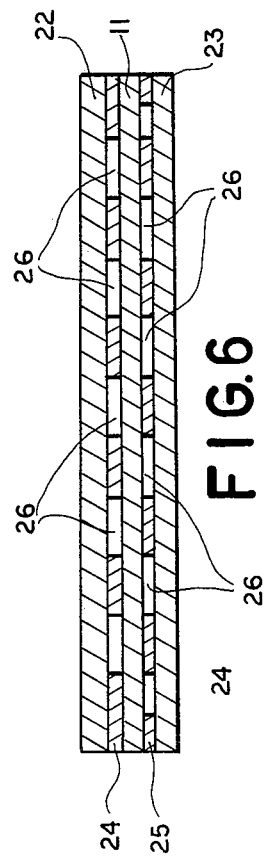

TAMPER-PROOF LAMINATED STICKER OR CARD

FIELD OF THE INVENTION

The present invention relates to a tamper-proof laminated sticker or card. More particularly this invention concerns such a sticker or card which bears indicia, normally of an official nature, and which is constructed so as to be irreversibly damaged if tampered with.

BACKGROUND OF THE INVENTION

It is standard practice for official seals, tags, stickers, identity cards, and the like to be printed on a special and extremely densely figured paper. Normally this paper itself is printed on its upper surface with the detailed figuring in such a manner that any attempt to erase or alter indicia printed on top of the thus-figured paper will eliminate the pattern and be highly visible. The disadvantage of this system is that the basic paper used is often very expensive. What is more it is possible for a skilled forger to redraw any damaged figuring, so that falsification is still possible.

It is also known to print the indicia on an extremely fragile foil. This is the procedure for approval stickers or the like which are then adhered by means of a strong pressure-sensitive adhesive to the vehicle, scale or other item. As the foil is very fragile, any attempt to lift it off one substrate and apply it to another will normally result in damaging of the foil. The disadvantage of this system is that it is still not impossible to lift the foil off and move it to another item. Furthermore it is occasionally possible merely to alter whatever indicia is on the foil without moving it. Finally another disadvantage is that this relatively fragile foil is frequently damaged during normal legitimate use of the item to which it is affixed.

It is also standard practice to make a so-called tamper proof identity card by laminating an indicia-bearing sheet between a pair of synthetic-resin sheets. Normally the two outer sheets are both transparent and of larger dimension than the indicia-bearing central sheet, and are secured to each other and to the respective opposite faces of the central sheet by means of a very strong bond, normally a pressure-sensitive adhesive or a thermally activated adhesive. This type of identity card has the disadvantage that a skilled forger can carefully peel off one or the other transparent sheets, so as to gain access to the sandwiched card and alter same.

OBJECTS OF THE INVENTION

It is therefore an object of the present invention to provide an improved laminate usable as a sticker and/or I.D. card.

Another object is to provide such a laminate which could be produced at very low cost, yet which nonetheless is tamper proof in that any attempt to tamper with it will result in irreversible damage to the laminate.

SUMMARY OF THE INVENTION

These objects are attained according to the instant invention in a laminate having a back sheet with a front face and a back face, indicia on the front face of the back sheet, means on the back face of the back sheet for securing it flatly on the substrate, an at least partially transparent front sheet having a back face overlying the front face of the back sheet, and means forming a plurality of bonds between the back face of the front sheet and the front face of the back sheet at spaced-apart bonded zones separated by and defining bond-free zones where the sheets are not bonded together.

With such a laminate, any attempt to peel apart the laminate will normally result in destruction of the indicia-bearing back sheet. According to a further feature of this invention the means on the back face of the back sheet is a plurality of adhesive zones that are generally complementary to the adhesive or bond zones between the sheets. Thus any given part of the back sheet, once the laminate is installed, will be adhered either to the front sheet or to the substrate on which the laminate is mounted, but not to both. Trying to peel such an arrangement off its substrate will inevitably result in pulling-apart of the back sheet, which according to the invention is normally made relatively fragile compared to the strength of the glue bonds securing it to the substrate and the front sheet.

In accordance with another feature of this invention the back sheet is formed with a plurality of throughgoing cuts. These cuts can be arranged as two sets of parallel lines, with the lines of one set being transverse to the lines of the other. Each of the lines is discontinuous at the corners of the rectangles or parallelograms formed by the two sets of transverse lines. Thus the back sheet is made up of an array of rectangles. According to this invention alternate rectangles are provided on the backs with adhesive for securing to the substrate. The lines interconnecting the rectangles are relatively small, so that any tampering with this sheet will inherently result in tearing of these webs and irreversible damage to the back sheet.

It is also within the scope of this invention to form each of the cuts as an annulus, that is bounding a respective cutout region. Each of these cutout regions is provided on its back with adhesive, but is not adhesively adhered on its front to the overlying sheet. Thus once again any attempt to peel off the laminate from its substrate will result in tearing-out of these cutout regions. This is best achieved according to the instant invention by forming each of the cutout regions as a star, and each of the bond-free regions overlying these cutout regions has a circle having a diameter slightly less than the major diameter of the star. Thus the points of the star will be secured to the front sheet, but the center portion of the star will be secured only to the substrate. As a result the laminate before installation will be relatively rugged, especially when an uncut, that is continuous, masking sheet is applied over the rear of the laminate which normally has a continuous and uniform coating of pressure-sensitive adhesive on the back face of its back sheet. Cutouts forming the stars may be continuous and completely subdivide the respective cutout regions from the rest of the back sheet, or may be discontinuous somewhat to make the laminate relatively stable prior to installation. Normally the front sheet is secured to the back sheet at its periphery by a continuous annular bond, and the back sheet, even when the adhesive that secures it to the substrate is not continuous over its entire back face, also has around its outer edge a continuous adhesive strip.

The laminate according to this invention can be used as a sticker, as for instance to indicate official certification of a scale or meter, for a motor-vehicle identification plate or license tag, or for other purposes where the indicia is related to the goods that are to carry it and must not be transferred. It is also possible to use the laminate according to this invention as an identity card or the like, merely by providing a rear cover sheet, normally also of transparent material, that is adhered to the rear surface of the back sheet. The indicia on the front face of the back sheet can be normal printed information, or can be made to be readable by a computer-type reader. It is also possible to provide magnetically encoded information on the back sheet as information which can only be read with the help of special lights or filters. It is further possible to provide written indicia on the back face of the front sheet, if desired. The front sheet furthermore normally has a front face which is constituted so as to be ink repelling, or otherwise constructed to prevent an alteration from being entered on the outside of the laminate in such a manner that it looks like part of the information on the covered back sheet. The various bonds may be made by an adhesive, by thermal welding, or by ultrasonic welding. It is also possible to provide cuts in the transparent top sheet so as to make the laminate even more fragile and destructible when tampered with.

According to further features of this invention the entire laminate may be of non-uniform thickness. The indicia may be characterized by raised letters and numerals, or the front sheet itself may be of non-uniform thickness. In particular it is advantageous when the front sheet has a tapered outer edge, so that once adhered to the back sheet it is virtually impossible to insert a tool between the two sheets and attempt to peel them apart. The front face of the front sheet can be made of a material which does not adhere well to other materials, so that an attempt to remove the entire laminate by means of an adhesive-coated tape or the like is out of the question. Furthermore this top sheet can be made to be sensitive to various chemicals and the like so that any attempt to write on top of it or to heat it and separate it would destroy it and the back sheet. In all embodiments it is advantageous that the front sheet is made substantially stronger, with respect to ripping, tearing, puncturing, and the like, than the back sheet. If the front sheet is made relatively stiff and of breakable material, any attempt to bend and tamper with the laminate will result in cracking this front sheet and destroy it. Normally bending beyond 50°-60° should result in such destruction. When used as a motor-vehicle license plate, the front face of the back sheet can normally be made reflective or even luminescent so that the indicia printed thereon—normally the plate number—will stand out and be easily visible even at night. When used as an official windshield sticker, the back face of the back sheet is provided underneath the adhesive with indicia that can be read through the preferably transparent adhesive. Thus such a sticker can easily be mounted on the inside of a windshield and can also be readable from the outside of the vehicle.

Furthermore according to the instant invention the back sheet can be formed at least partially of a filament, as a heavy string or wire that serves as a meter seal or the like, with this heavy string or wire pressing through a pair of registering holes and so it can indicate when the meter has been tampered with. For such an arrangement the ends of the wire or string are sandwiched between the front sheet and the rear cover sheet and can even constitute or take the place of the back sheet. In fact such an arrangement can be made with a regular back sheet, and in such a manner that it is filled out by the personnel in question and then sealed up, so that on a later date the information can be read off the laminated sheet and any tampering with the seal will be immediately apparent. In such an arrangement the front sheet and the rear cover sheet can be adjacent panels of a single piece of transparent synthetic-resin material that is simply folded over the back sheet and, in appropriate instances, over the wire or string described above. In fact such an arrangement can be laminated together with the handle of a valve, head of a screw, or the like between the back sheet and the rear cover sheet, which allows again any tampering to be easily ascertained.

It is also possible to make the back sheet of a material having a very low fatigue level, while the front sheet and cover sheet, if provided, are of highly bendable material. Thus anybody bending the seal or card produced thereby in order to tamper with it or open it up would overly fatigue the back sheet and be unable subsequently to eliminate the tears and folds in it, which form even before it is uncovered from the front sheet or rear cover sheet. What is more the indicia printed on the back sheet can be printed in a thermally activatable ink, one whose color changes when heated. Such an ink would indicate whenever the card or seal had been tampered with by means of heat, and would also allow when ready to determine if the indicia marked on the card or seal were authentic, as the reader need merely then apply heat to see if they change color. Counterfeiting of such thermally activatable ink would be an extremely expensive and laborious job.

BRIEF DESCRIPTION OF THE DRAWING

FIG. 5 is a perspective view of another laminate according to this invention;

FIG. 6 is a section through the laminate of FIG. 5; and

SPECIFIC DESCRIPTION

Figure 2:
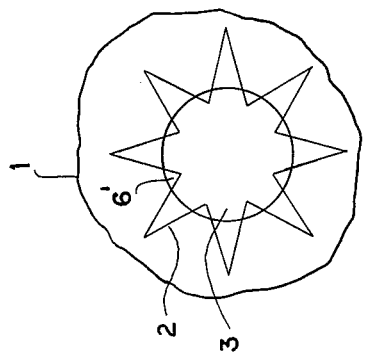
FIG. 2 is a large-scale top-view detail of FIG. 1.
Figure 1:
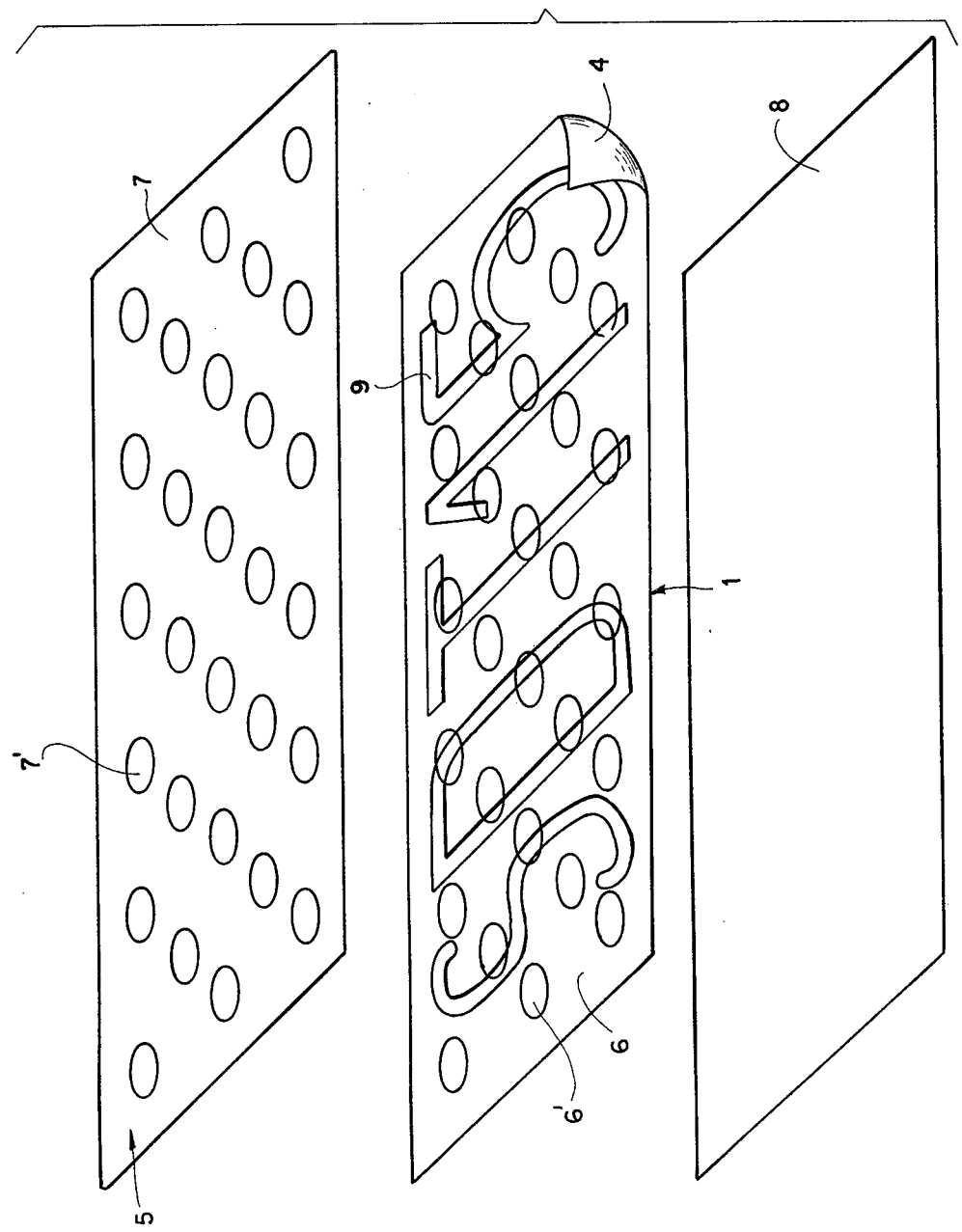
FIG. 1 is an exploded sectional view of the laminate according to this invention.

As shown in FIGS. 1 and 2 a laminate according to this invention basically comprises a back sheet 1, here made of a reflective thin metallic foil and imprinted on its top or front face with indicia 9, here a license-plate number. The sheet 1 carries on its under or backside a layer 4 of pressure-sensitive adhesive and is normally covered by means of a masking sheet 8. The adhesive 4 sticks to the sheet 1 much more strongly than it does to the sheet 8, so that this sheet 8 can be pulled off leaving all of the adhesive 4 on the back face of the back sheet.

As also shown in FIG. 2 the sheet 1 is punched with an array of star-shaped cutout lines 2 each defining a star-shaped cutout region 3. What is more the sheet 1 has on its upper or front face a layer 6 of adhesive with adhesive-free circles or spots 6' corresponding to the center of each cutout region 3, but not extending as far as the points of the star of such a region 3. A transparent cover sheet 5 is of the same rectangular shape as the sheets 1 and 8 and has on its back face, that is the face toward the sheet 1, a layer of adhesive 7 with adhesive-free spots 7' arranged to mate identically with the spots 6'. Thus when the three sheets 1, 5 and 8 are laminated together the central portions of each star-shaped cutout region 3 will not be adhered to the front sheet 5, but will have on their back surfaces the adhesive 4. Thus it is possible to pull off the masking sheet 8 and adhere the laminate formed with the sheets 1 and 5 to a hard substrate. Any subsequent attempt to strip this laminate from the substrate will result in pulling out of the central section of each of the star-shaped cutouts 3, thereby irreversibly damaging the laminate.

Figure 3:
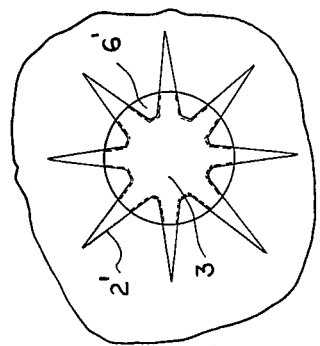
FIG. 3 is a view similar to FIG. 2 showing a variation on the arrangement of FIG. 1.

It is also possible to form the cutout region 3 as shown in FIG. 3 by discontinuous lines 2'. These lines leave webs of paper or foil at the bases of the points of the star so that the laminate hold together better prior to assembly.

It is noted that either of the layers 6 and 7, but not both of them, could be eliminated.

Figure 4:
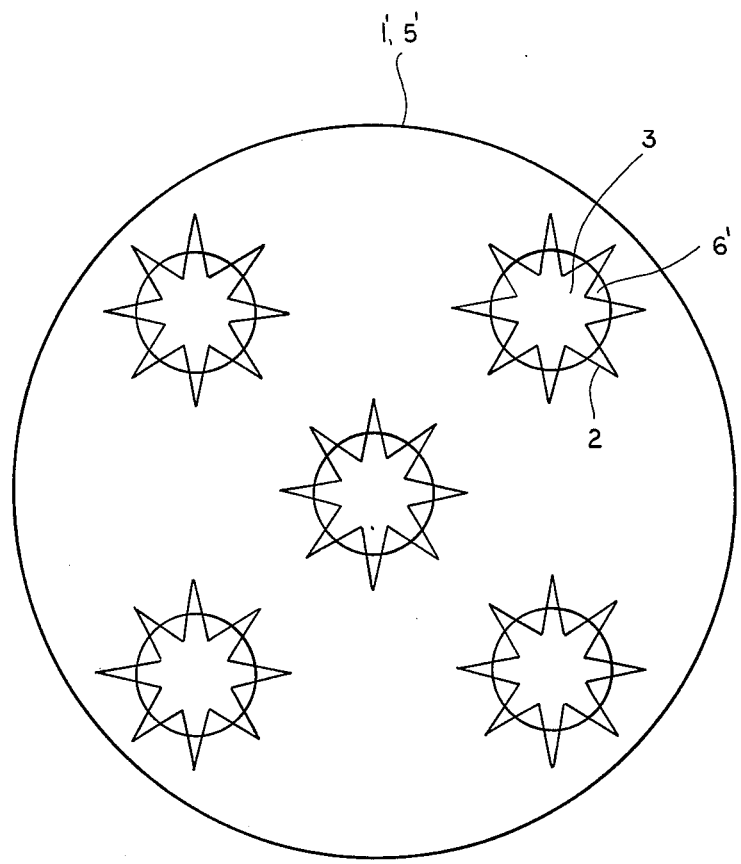
FIG. 4 is a top view of a seal manufactured in accordance with FIG. 1.

FIG. 4 shows how a pair of circular sheets 1' and 5' functional identical to the sheets 1 and 5 of FIG. 1 can be used as a round seal. Such a seal could bear indicia indicating, for instance, that the item it is affixed to has been inspected.

FIGS. 5 and 6 show another arrangement wherein a backing sheet 11 is subdivided into squares 12 and 13 by means of a first set of parallel cut lines 14 and a second set of parallel cut lines 15 crossing the first set of lines 14 at right angles. The result is a checkerboard array, with the sheet 11 only holding together at the corners 16 where the lines are discontinuous. As shown in FIG. 6 alternate squares 12 are provided on their top faces with rectangles 24 of adhesive that secure them to the back face of a continuous transparent cover sheet 22, with clear zones 26 between corresponding to the squares 13. Squares 13 are provided on their back faces with adhesive rectangles 24 that secure them to a masking sheet 23, with continuous adhesive bands 25 being provided around the edges between the sheets 11, 22, and 23. Thus each of the squares 12 and 13 will only be secured on one side, so that any attempt to peel off the laminate thus formed will result in half of the squares sticking to the surface to which it is adhered.

Figure 7:
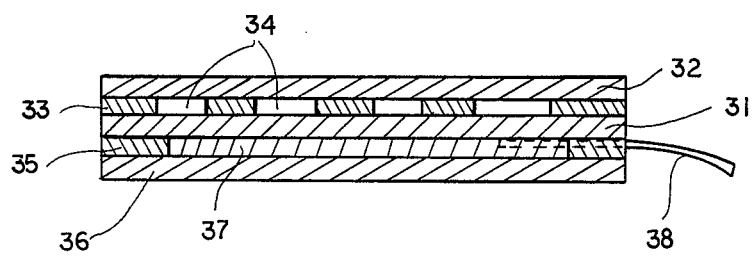
FIGS. 7 and 8 are a cross section and a top view of another laminate according to this invention.
Figure 8:
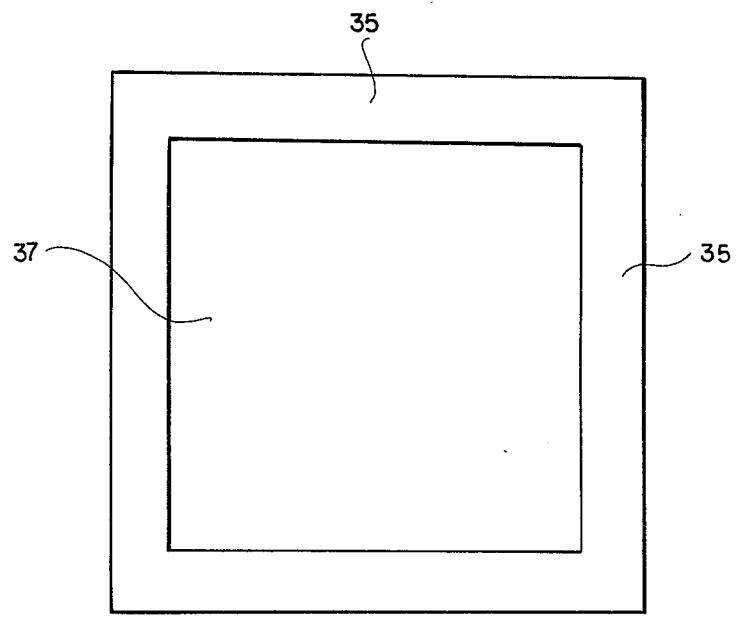

In FIG. 7 a laminate for use as an identity card or the like is shown. This laminate comprises a tag or insert 37 forming half of a back sheet, the other half being constituted by a clear sheet 31 secured by means of adhesive zones 33 defining clear zones 34 to another clear front sheet 32. A clear back sheet 36 is secured to the back of the insert 37, and an adhesive band 35 extends around the insert 37. A string or wire 38 may extend into the back sheet 37. Such an arrangement may be provided for use in sealing a lock, meter, or the like. The person using it can write whatever indicia he or she wants on the insert 37 before positioning the wire 38 on it and sealing the sheet 36 over top of it. Attempts at tampering will be apparent with this and the other above-described arrangements, through destruction of the sheet 37 and 31 by pulling apart the adhesive dots 33. The sheet 36 can be unitary with the sheet 32, and can extend straight therefrom until it is folded over for use.

I claim:

1. A laminate comprising:
   a relatively fragile back sheet having a back face and a front face;
   means on said back face of said fragile back sheet for securing same flatly on a substrate;
   indicia on said front face of said fragile back sheet;
   an at least partially transparent and relatively strong front sheet having a back face overlying said front face of said fragile back sheet; and
   means forming a plurality of relatively strong bonds between said back face of said strong front sheet and said front face of said fragile back sheet at spaced-apart bonded zones separated by and defining bond-free zones where said strong and fragile sheets are not bonded together, said indicia partially overlapping said bonded zones and partially overlapping said bond-free zones, whereby an attempt to separate said strong and fragile sheets will tear said relatively fragile back sheet and destroy said indicia.

2. The laminate defined in claim 1 wherein said means on said back face of said back sheet includes a plurality of adhesive zones spaced apart by and defining adhesive-free zones.

3. The laminate defined in claim 2 wherein said adhesive zones on said back face of said back sheet are offset from said bonded zones between said sheets, whereby when said laminate is installed some parts of said back sheet will be bonded only to said substrate and other parts will be bonded only to said front sheet.

4. The laminate defined in claim 2 wherein said adhesive zones on said back face of said back sheet and said bonded zones between said sheets are in respective regular arrays offset from each other.

5. The laminate defined in claim 1, further comprising means forming an annular and continuous bond between said back sheet and said front sheet at the outer peripheries thereof, said sheets being geometrically similar and in registration.

6. The laminate defined in claim 1, wherein said back sheet is formed with a plurality of throughgoing cuts.

7. The laminate defined in claim 6 wherein each of said cuts is generally annular and defines a respective cutout region at least partially in registration with a respective one of said bond-free zones.

8. The laminate defined in claim 7 wherein said means on said back face includes an adhesive generally covering all of said back face of said back sheet, whereby said cutout regions will remain adhered to said substrate if said laminate is pulled off same after installation.

9. The laminate defined in claim 7 wherein each of said cuts is continuous and extends completely around the respective cutout region.

10. The laminate defined in claim 7 wherein each of said cuts is discontinuous and only generally separates the respective cutout region from the rest of said back sheet.

11. The laminate defined in claim 7 wherein each of said cutout regions is generally star-shaped having a plurality of points and is aligned with a respective bond-free zone with said points extending outwardly beyond the respective bond-free zone, said bond free zones therefore being spots each covering the center of a respective star-shaped cutout region.

12. The laminate defined in claim 11, further comprising an uncut masking sheet covering said back face of said back sheet prior to installation thereof, said means on said back face being adhesive releasably securing said masking sheet to said back sheet, said adhesive on said back face of said back sheet being pressure sensitive and more strongly adhered to said back face of said back sheet than to said masking sheet.

13. The laminate defined in claim 7 wherein said cuts are arranged in a first set of parallel lines and a second set of parallel lines transverse to said first set and defining therewith a plurality of rectangles having corners, said bond-free zones corresponding to some of said rectangles.

14. The laminate defined in claim 13 wherein said lines of said cuts are discontinuous at said corners.

15. The laminate defined in claim 13 wherein alternate rectangles are in bond-free zones.

16. The laminate defined in claim 1 wherein said front sheet has an ink-repelling front face.

17. The laminate defined in claim 1 wherein said front sheet is of nonuniform thickness.

18. The laminate defined in claim 1 wherein said front sheet has a tapered outer edge.

19. The laminate defined in claim 1 wherein said front sheet is larger than said back sheet and has an outer periphery extending outwardly beyond the periphery of said back sheet, said outer periphery of said front sheet being provided with means for securing itself to said substrate.

20. The laminate defined in claim 1 wherein said front sheet is substantially more tear resistant than said back sheet.

21. The laminate defined in claim 1, further comprising a filament attached to said back sheet and extending out from between said sheets.

22. The laminate defined in claim 1, wherein said back sheet has an upper transparent layer overlying said indicia and secured at said bonds to said front sheet, said laminate further comprising a transparent rear cover sheet adhered to said back face of said back sheet.

23. The laminate defined in claim 22 wherein said transparent layer of said back sheet is larger than said back sheet and of substantially the same size and shape as said front sheet and said rear cover sheet, said laminate further comprising an annular bond between said transparent layer and said rear cover sheet and surrounding said back sheet.

24. The laminate defined in claim 1 wherein said front face of said back sheet is reflective.

* * * * *